(12) United States Patent
Abdulkarim et al.

(10) Patent No.: US 10,914,857 B2
(45) Date of Patent: Feb. 9, 2021

(54) POROSITY INDEPENDENT METHODOLOGY FOR PERMEABILITY PREDICTION BASED ON MICRO-RESISTIVITY IMAGES AND LATEROLOG RESISTIVITIES

(71) Applicant: Halliburton Energy Services, Inc., Houston, TX (US)

(72) Inventors: Anar Rasul Abdulkarim, Baku (AZ); Ahmet Aki, Dubai (AE)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/781,400

(22) PCT Filed: Aug. 22, 2017

(86) PCT No.: PCT/US2017/047980
§ 371 (c)(1),
(2) Date: Jun. 4, 2018

(87) PCT Pub. No.: WO2019/040049
PCT Pub. Date: Feb. 28, 2019

(65) Prior Publication Data
US 2020/0271820 A1 Aug. 27, 2020

(51) Int. Cl.
*G01V 3/32* (2006.01)
*E21B 47/04* (2012.01)
*G01V 3/38* (2006.01)

(52) U.S. Cl.
CPC .............. *G01V 3/32* (2013.01); *E21B 47/04* (2013.01); *G01V 3/38* (2013.01)

(58) Field of Classification Search
CPC .......... E21B 47/04; G01V 3/38; G06T 1/0078
See application file for complete search history.

(56) References Cited

U.S. PATENT DOCUMENTS

| 8,319,498 B2 | 11/2012 | Wang |
| 9,081,114 B2 | 7/2015 | Nie et al. |
| 2004/0218837 A1* | 11/2004 | Shiyama ............. G06F 16/5838 382/305 |

(Continued)

FOREIGN PATENT DOCUMENTS

| WO | 2004029664 A1 | 4/2004 |
| WO | 2016053330 A1 | 4/2016 |
| WO | 2017058043 A1 | 4/2017 |

OTHER PUBLICATIONS

Tang, X.M, et al., "Joint Interpretation of Formation Permeability From Wireline Acoustic, NMR, and Image log Data," SPWLA 39th Annual Logging Symposium, May 26-29, 1998, 14 pages.

(Continued)

*Primary Examiner* — Alvaro E Fortich
(74) *Attorney, Agent, or Firm* — Benjamin Ford; Parker Justiss, P.C.

(57) ABSTRACT

A system and a method for predicting a performance of a well is provided. In one example, the method includes determining a number of conductive pixels from a histogram of micro-resistivity values measured by a logging tool from a section of a well at a certain depth, calculating a ratio of the conductive pixels to a total number of pixels in the histogram and deriving a porosity-independent permeability indicator for the section at the certain depth based on the ratio and a fluid mobility value from a formation tester.

20 Claims, 6 Drawing Sheets

(56) References Cited

U.S. PATENT DOCUMENTS

| | | | | |
|---|---|---|---|---|
| 2009/0145600 A1* | 6/2009 | Wu | ............... | G01V 1/50 |
| | | | | 166/250.02 |
| 2010/0128932 A1* | 5/2010 | Dvorkin | ............ | E21B 47/00 |
| | | | | 382/109 |
| 2010/0185393 A1 | 7/2010 | Liang et al. | | |
| 2011/0184711 A1 | 7/2011 | Altman et al. | | |
| 2011/0231164 A1* | 9/2011 | Zhang | ............ | G01V 99/005 |
| | | | | 703/2 |
| 2015/0104078 A1* | 4/2015 | Varslot | ............ | G01N 15/088 |
| | | | | 382/109 |
| 2015/0330190 A1 | 11/2015 | Wu et al. | | |
| 2016/0032717 A1 | 2/2016 | Parker | | |
| 2017/0235011 A1 | 8/2017 | Wu | | |

OTHER PUBLICATIONS

Delhomme, J.P., "A Quantitative Characterization of Formation Heterogeneities Based on Borehole Image Analysis," SPWLA 33rd Annual Logging Symposium, Jun. 14-17, 1992, 25 pages.

Newberry, B.M., et al., "Analysis of Carbonate Dual Porosity Systems from Borehole Electrical Images," SPE 35158, Permian Basin Oil & Gas Recovery Conference, Midland, Texas, Mar. 27-29, 1996, 7 pages.

Chitale, D.V., et al., "Application of a New Borehole Imager and Technique to Characterize Secondary Porosity and Net-To-Gross in Vugular and Fractured Carbonate Reservoirs in Permian Basin," SPWLA 45th Annual Logging Symposium, Jun. 6-9, 2004, The Netherlands, 13 pages.

Adeboye, Y.B., et al., "Permeability Estimation and Hydraulic Zone Pore Structures Identification Using Core and Well Logs Data," Petroleum & Coal, ISSN-1337-7027, Department of Petroleum and Gas Engineering, University of Lagos, Akoka, Lagos, Nigeria, Jan. 15, 2012, 7 pages.

Delhomme, J-P, "The quest for permeability evaluation in wireline logging," Schlumberger Water Services, France, 2014, 12 pages.

Chen, C., et al., "A New Approach for Permeability Distribution in Carbonates Using LWD High-Resolution Image Analysis," SPE-183859-MS, SPE Middle East Oil & Gas Show and Conference, Manama, Kingdom of Bahrain, Mar. 6-9, 2017, 8 pages.

\* cited by examiner

POROSITY INDEPENDENT METHODOLOGY FOR PERMEABILITY PREDICTION BASED ON MICRO-RESISTIVITY IMAGES AND LATEROLOG RESISTIVITIES

CROSS-REFERENCE TO RELATED APPLICATION

This application is the National Stage of, and therefore claims the benefit of, International Application No. PCT/US2017/047980 filed on Aug. 22, 2017, entitled "A NEW POROSITY INDEPENDENT METHODOLOGY FOR PERMEABILITY PREDICTION BASED ON MICRO-RESISTIVITY IMAGES AND LATEROLOG RESISTIVITIES". The above application is commonly assigned with this National Stage application and is incorporated herein by reference in its entirety.

BACKGROUND

Oil and gas operations such as well completion, stimulation and reservoir managements use various models/simulations to characterize and estimate a reservoir and forecast production therefrom. Permeability (a measure of fluid conductivity in porous medium) is a critical parameter in such models as it controls the requirements of the oil and gas operations, and a poorly estimated permeability will make the model inaccurate and unreliable.

Current methods of estimating permeability from microresistivity images, which are based on porosity transforms are not accurate enough, especially for carbonates, to provide reliable permeability values. This is due to porosity in carbonates often being not intergranular, e.g., as in sandstones, and consisting of various pore types as a result from the various diagenetic effects, such as dolomitization, leaching, and fracturing, and pores such as vugs not being connected with other pores in carbonates. For example, non-connected vugs in a carbonate contribute to porosity but very little to permeability. Conversely, the presence of fractures significantly increases permeability, but creates little additional porosity if fractures have not been enlarged by dissolution.

BRIEF DESCRIPTION

Reference is now made to the following descriptions taken in conjunction with the accompanying drawings, in which.

DETAILED DESCRIPTION

Existing methodologies for deriving permeability from micro-resistivity images rely on porosity transforms. But as the relationship between porosity and permeability in carbonates is not well defined, it has been desirable to investigate alternative methodologies to improve permeability estimates in carbonates. Introduced herein is a new workflow that utilizes downhole logging tools, such as a LWD tool or a measuring while drilling (MWD) tool. The logging tools can also use, for example, a wireline, slickline, or coiled tubing. The logging tools can provide a micro-resistivity image for permeability estimation, without using porosity data.

In a micro-resistivity image, voids encountered during drilling in a water-based mud (WBM) system are filled with conductive fluid and displayed as darker, conductive pixels. The introduced method identifies and determines a number of these conductive pixels from a histogram that is generated from a micro-resistivity image of micro-resistivity values measured from a section of a well. Using the combination of the mathematical mean of the resistivity values with laterolog resistivity measurements, the introduced method derives a cutoff value as an invasion indicator of mud filtrate. A conductive pixels ratio is then calculated by dividing the number of conductive pixels below the cutoff value with the total number of pixels at each depth. The introduced method normalizes this continuous ratio to formation tester measured fluid mobility values and provides a qualitative permeability indicator.

In the introduced method, other sources of log-derived permeability values such as values from acoustic Stoneley waves and nuclear magnetic resonance (NMR) data of the same or offset wells are compared with the permeability indicator to fine-tune the method. The introduced method also includes partitioning of a horizontal section based on the derived permeability profiles and petrophysical attributes because the determination of lateral permeability variations is a critical factor for optimizing the stimulation and completion design.

Figure 2:
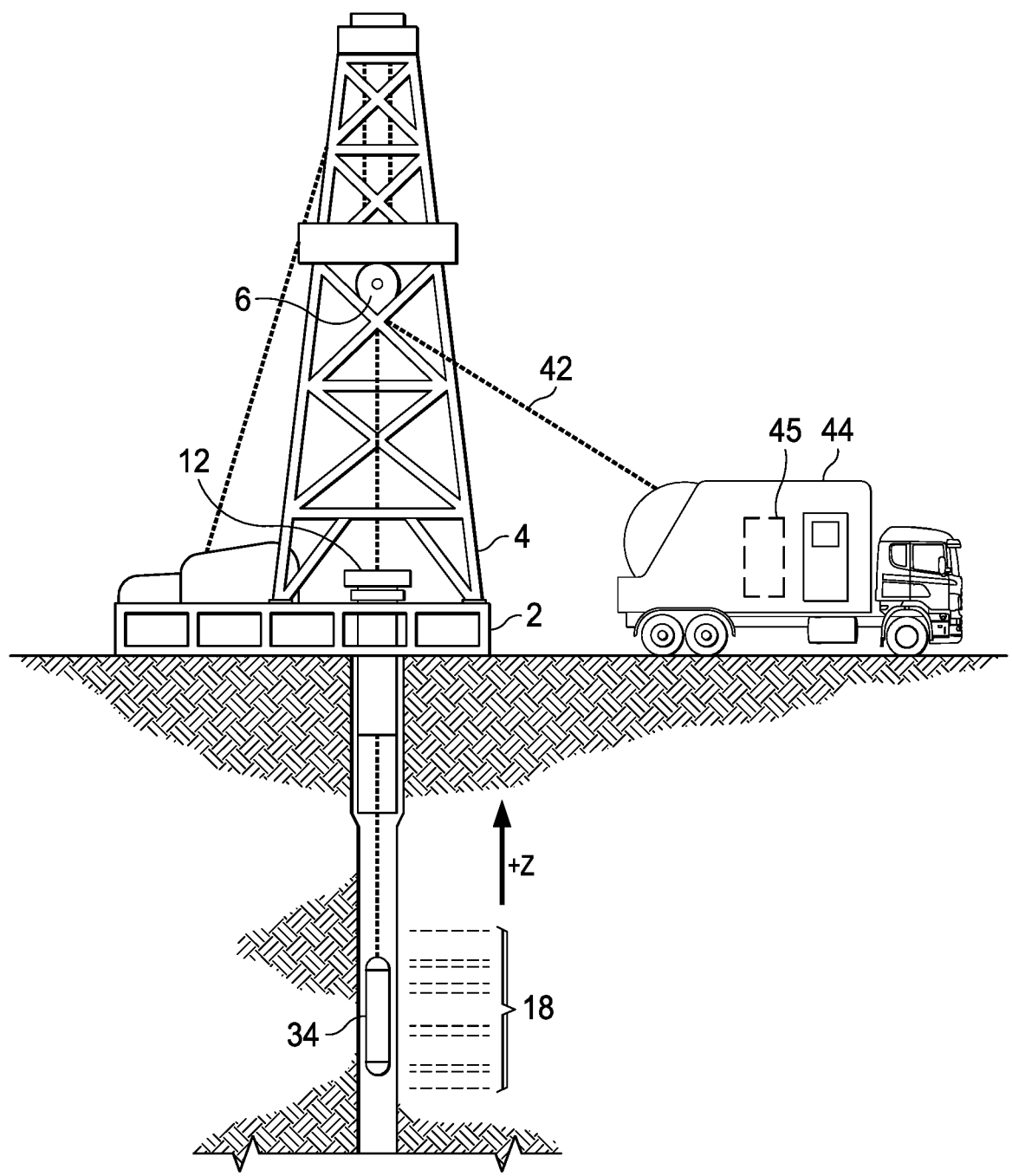
FIG. 2 illustrates an environment for wireline logging.
Figure 3:
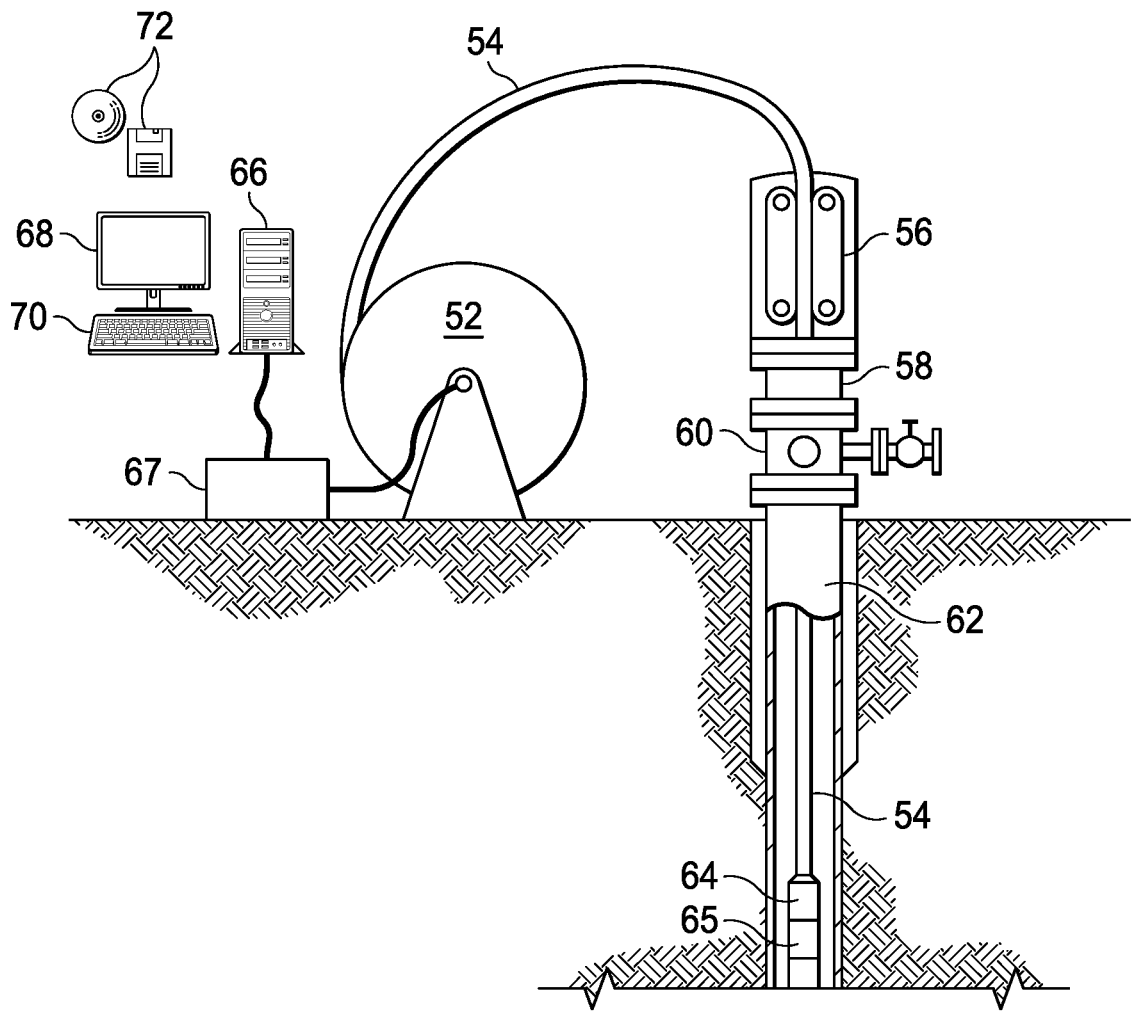
FIG. 3 illustrates an environment for tubing-conveyed logging.

The disclosed systems and methods can be best understood in the context of the larger environments in which they operate. Suitable environments are illustrated in FIGS. 1-3.

Figure 1:
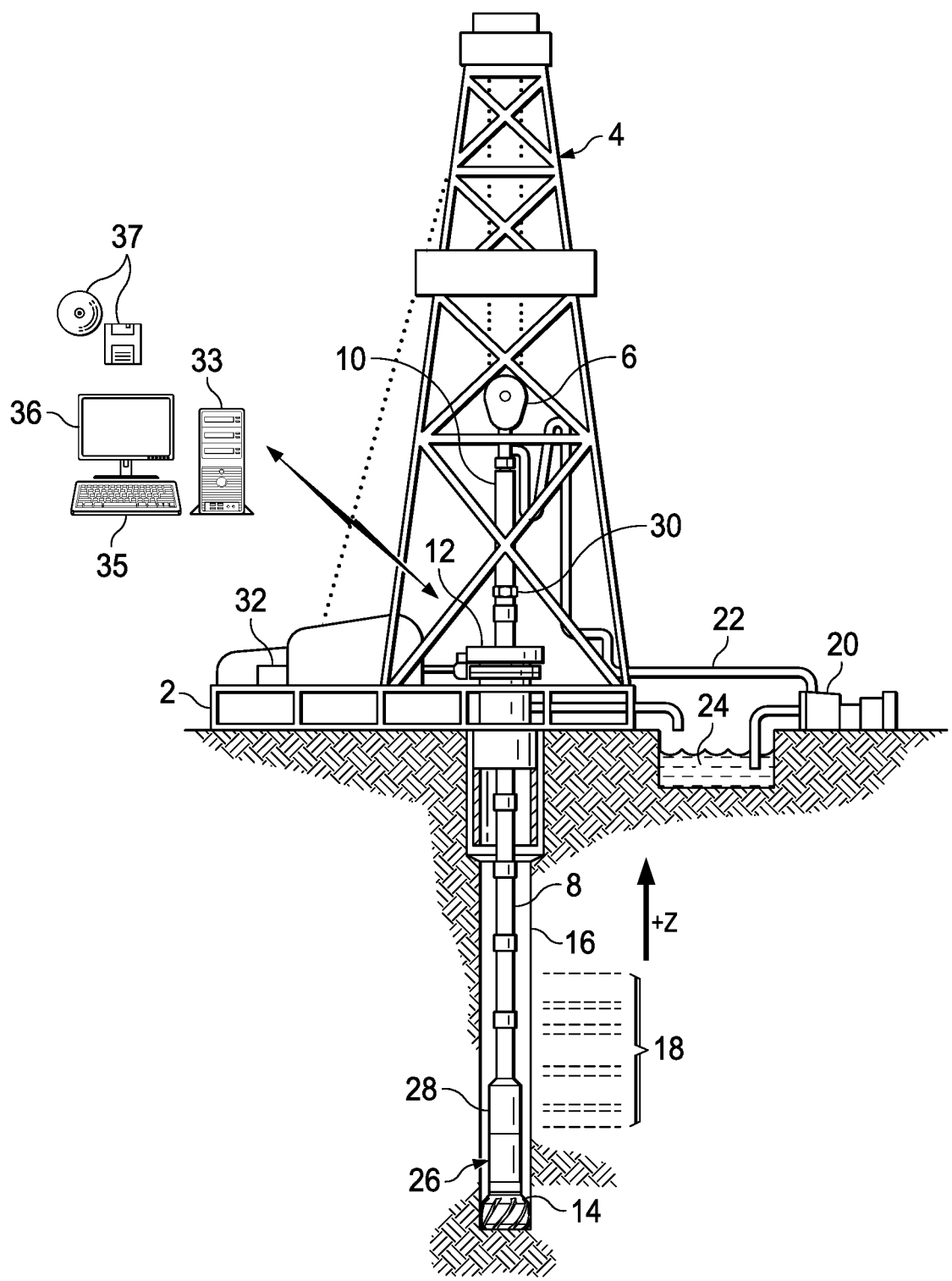
FIG. 1 illustrates an environment for logging while drilling (LWD)

FIG. 1 shows an illustrative logging while drilling (LWD) environment. A drilling platform 2 is equipped with a derrick 4 that supports a hoist 6 for raising and lowering a drill string 8. The hoist 6 suspends a top drive 10 suitable for rotating the drill string 8 and lowering the drill string through the well head 12. Connected to the lower end of the drill string 8 is a drill bit 14. As bit 14 rotates, it creates a borehole 16 that passes through various formations 18. A pump 20 circulates drilling fluid through a supply pipe 22 to top drive 10, down through the interior of drill string 8, through orifices in drill bit 14, back to the surface via the annulus around drill string 8, and into a retention pit 24. The drilling fluid transports cuttings from the borehole into the pit 24 and aids in maintaining the integrity of the borehole 16. Various materials can be used for drilling fluid, including a salt-water based conductive mud.

In the illustrated embodiment, a LWD tool suite 26 is integrated into the bottom-hole assembly near the bit 14. As the bit extends the borehole through the formations, the tool suite 26 collects measurements relating to various formation properties as well as the tool orientation and various other drilling conditions. In one embodiment, the tool suite 26 may take the form of a drill collar, i.e., a thick-walled tubular that provides weight and rigidity to aid the drilling process. The LWD tool suite 26 may include a laterolog tool and a micro-resistivity imaging sensor to measure formation resistivity at different distances, e.g., shallow, medium or deep resistivity measurement, from the borehole wall. A telemetry sub 28 may be included to transfer images and measurement data to a surface receiver 30 and to receive commands from the surface. In some embodiments, the telemetry sub 28 does not communicate with the surface, but rather stores logging data for later retrieval at the surface when the logging assembly is recovered.

At the surface, a computer system 33 is configured to communicate with the telemetry sub 28 to set logging parameters and collect logging information from the one or more logging tools 26 such as a laterolog tool and micro-resistivity imaging sensor. The computer system 33 is configured by software in a non-transient computer readable medium 37 to monitor and control downhole instruments such as the tool suite 26 and telemetry sub 28. The computer system 33 includes a display device 36 and a user-input device 35 to enable a human operator to interact with the computer system 33. The computer system 33 may be a distributed system having components/modules thereof located away from the surface. For example, the computer system 33 or portions thereof can be located at a data processing center, a computing/logging facility, or another suitable location.

At various times during the drilling process, the drill string 8 may be removed from the borehole as shown in FIG. 2. Once the drill string has been removed, logging operations can be conducted using a wireline logging sonde 34, e.g., a probe suspended by a cable 42 having conductors for transporting power to the sonde and telemetry from the sonde to the surface. The wireline logging sonde 34 may have pads and/or centralizing springs to maintain the tool near the axis of the borehole as the tool is pulled uphole. The logging sonde 34 can include a variety of sensors including a laterolog tool and a micro-resistivity imaging sensor for measuring formation resistivity. A logging/computing facility 44 collects measurements from the wireline logging sonde 34, and includes a computer system 45 configured similarly to the computer system 50 of FIG. 1 for processing and storing the measurements gathered by the sensors.

An alternative logging technique is tubing-conveyed logging. FIG. 3 shows an illustrative coil tubing logging system in which coil tubing 54 is pulled from a spool 52 by a tubing injector 56 and injected into a well through a packer 58 and a blowout preventer 60 into the well 62. In the well 62, a supervisory sub 64 and one or more logging tools 65 are coupled to the coil tubing 54 and configured to communicate to a computer system 66 configured similarly to the computer system 50 of FIG. 1 via information conduits or other telemetry channels. An uphole interface 67 may be provided to exchange communications with the supervisory sub 64 and receive data to be conveyed to the surface computer system 66.

Figure 4:
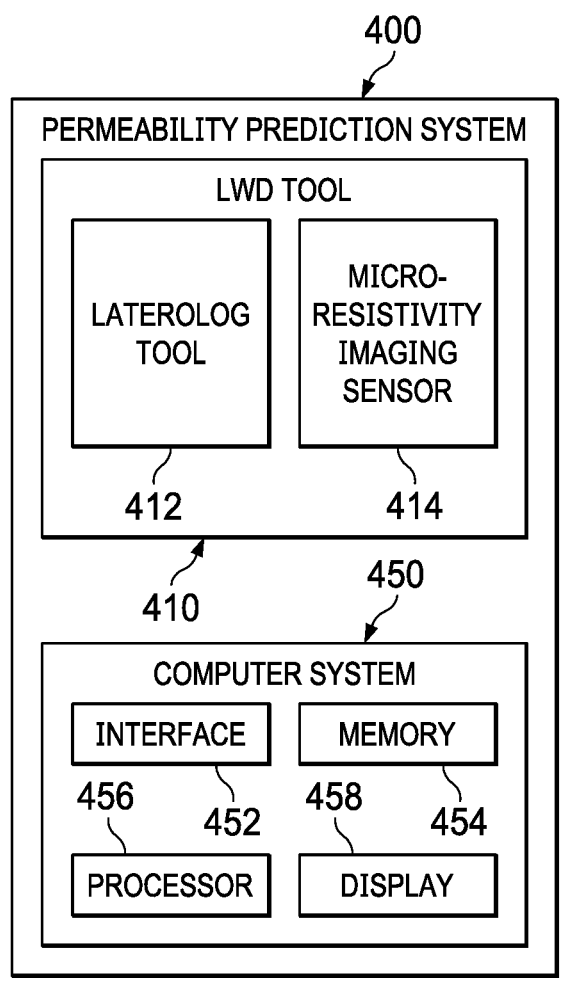
FIG. 4 illustrates a block diagram of an example of a system for predicting a performance of a well.

FIG. 4 illustrates a block diagram of an example of a permeability prediction system 400. The system 400 derives a permeability indicator of a well from micro-resistivity measurements without using porosity data. It is understood that micro-resistivity is measured by transmitting current to voids in the formation having conductive drilling mud, which has invaded the formation during drilling, e.g. in a WBM system. The system 400 is used in a downhole operation such as such as those shown in FIGS. 1-3 and includes a LWD tool 410 and a computer system 450.

The LWD tool 410 is configured to measure micro-resistivity values from a section of the well at different depths using various sensors such as a laterolog tool 412 and a micro-resistivity imaging sensor 414. The LWD tool 410 may be implemented as a part of a bottom-hole assembly, e.g., the LWD tool suite 26 in FIG. 1, and as a part of a wireline logging sonde or tubing, e.g., the wireline logging sonde 34 in FIG. 2 or the coil tubing 54 in FIG. 3.

The laterolog tool 412 measures resistivity at different distances from the borehole wall. The laterolog tool 412 may measure resistivity from the borehole wall as close as approximately three (3) inches for shallow resistivity measurement and as far as approximately 10 inches from the borehole wall for deep resistivity measurement. Although not shown, the laterolog tool 412 includes a set of electronic sensors, e.g., electrodes, that are connected to a power source and provides current through the borehole fluid into the formation and to a remote reference electrode. The analysis of the separation between the measurements shows how deep the fluid has invaded (diffused) into the formation, indicating a permeability property of the formation.

The micro-resistivity imaging sensor 414 measures and records all resistivity at 360 degrees within 0.5 inch from the borehole wall at different depths and produces a high-resolution micro-resistivity image as a result. As the body of the LWD tool 410 rotates when drilling, a set of button electrodes mounted on the body, e.g., on pads, flaps or stabilizers, of the tool 410 have a full, 360 degree coverage around the circumference of the borehole. The button electrodes are kept at constant potential and an applied voltage causes an alternating current to flow from each button electrode into the formation and to be received at a return electrode on the upper part of the tool 410. The resolution of micro-resistivity image depends on the size of the employed button electrodes. In one embodiment, the high-resolution micro-resistivity image has a pixel size of 0.4 inches.

The computer system 450 derives a permeability indicator from the measurements from the laterolog tool 412 and the micro-resistivity imaging sensor 414 of the LWD tool 410. The computer system 450 includes an interface 452, a memory 454, a processor 456, and a display 458. The computer system 450 may be a surface computer system such as the systems 33, 45, 66 in FIGS. 1, 2 and 3. The interface 452, the memory 454, the processor 456, and the display 458 may be connected together via conventional means.

The interface 452 is configured to receive measurements from the LWD tool 410, e.g., the laterolog tool 412, the micro-resistivity imaging sensor 414. The interface 452 is also configured to receive other log-derived measurements such as Stoneley waves, NMR and formation tester measurements. Similar types of measurements from offset wells can also be received. The interface 452 can be a conventional interface that is used to receive and transmit data. The interface 452 can include multiple ports, terminals or connectors for receiving or transmitting the data. The ports, terminals or connectors may be conventional receptacles for communicating data via a communications network.

The memory 454 may be a conventional memory that is constructed to store data and computer programs. The memory 454 may be a non-transient computer readable medium containing program instructions that direct the operation of a processor, such as the processor 456, when executed thereby. The program instructions may correspond to algorithms that provide the functionality of the operating schemes disclosed herein. For example, the program instructions may correspond to the algorithm or algorithms that predict a performance of a well by deriving a porosity-independent permeability indicator. The memory 454 or at least a portion thereof can be a non-volatile memory.

The processor 456 can be a conventional general purpose processor or a special purpose processor that is configured to carry out program instructions stored in the memory 454. In the illustrated embodiment, the processor 456 is configured to determine a number of conductive pixels in a histogram generated from an image of micro-resistivity values measured by the micro-resistivity imaging sensor 414 from a section of a well at a certain depth. More specifically, the processor 456 can determine the number of conductive pixels in the histogram by calculating an average value of the micro-resistivity values at the certain depth, determining an invasion indicator using a separation between shallow and deep laterolog resistivity measurements at the certain depth from the laterolog tool 412, and deriving a cutoff value at the certain depth based on the average value and the invasion indicator. The conductive pixels are pixels that have micro-resistivity values less than the cutoff value.

The processor 456 is further configured to calculate a ratio of the conductive pixel to a total number of pixels in the histogram at the certain depth using the number of the conductive pixels. The processor 456 can then derive the porosity-independent permeability indicator by normalizing the ratio to a corresponding fluid mobility value from formation tester data acquired on a wipe run by a formation tester (not shown). A wipe run is a run subsequent a drilling run, wherein a string with a formation tester is built and run into a borehole for pressure and mobility measurement. A wipe run may be performed for different purposes such as for cleaning a borehole or performing different types of measurements. The formation tester, e.g., a wireline formation tester, may be a part of the system 400.

In the illustrated embodiment, the processor 456 is further configured to compare the porosity-independent permeability indicator to corresponding log-derived permeability values from outside sources to benchmark further data gathering requirements. Log-derived permeability values, such as an acoustic Stoneley permeability values and core/nuclear magnetic resonance (NMR) permeability values from the same or an offset well, and the formation tester values may be used for the comparison. Once the further data gathering requirements, e.g., a desired number of correlations with outside source values, are met, the processor 456 can build an empirical normalization and obtain standard normalization factors, which obviate the need for further comparison. The processor 456 is also configured to partition the section of the well using a petrophysical attribute such as a rock mechanical moduli, a brittleness and/or a porosity, and the derived porosity-independent permeability indicator.

Figure 5:
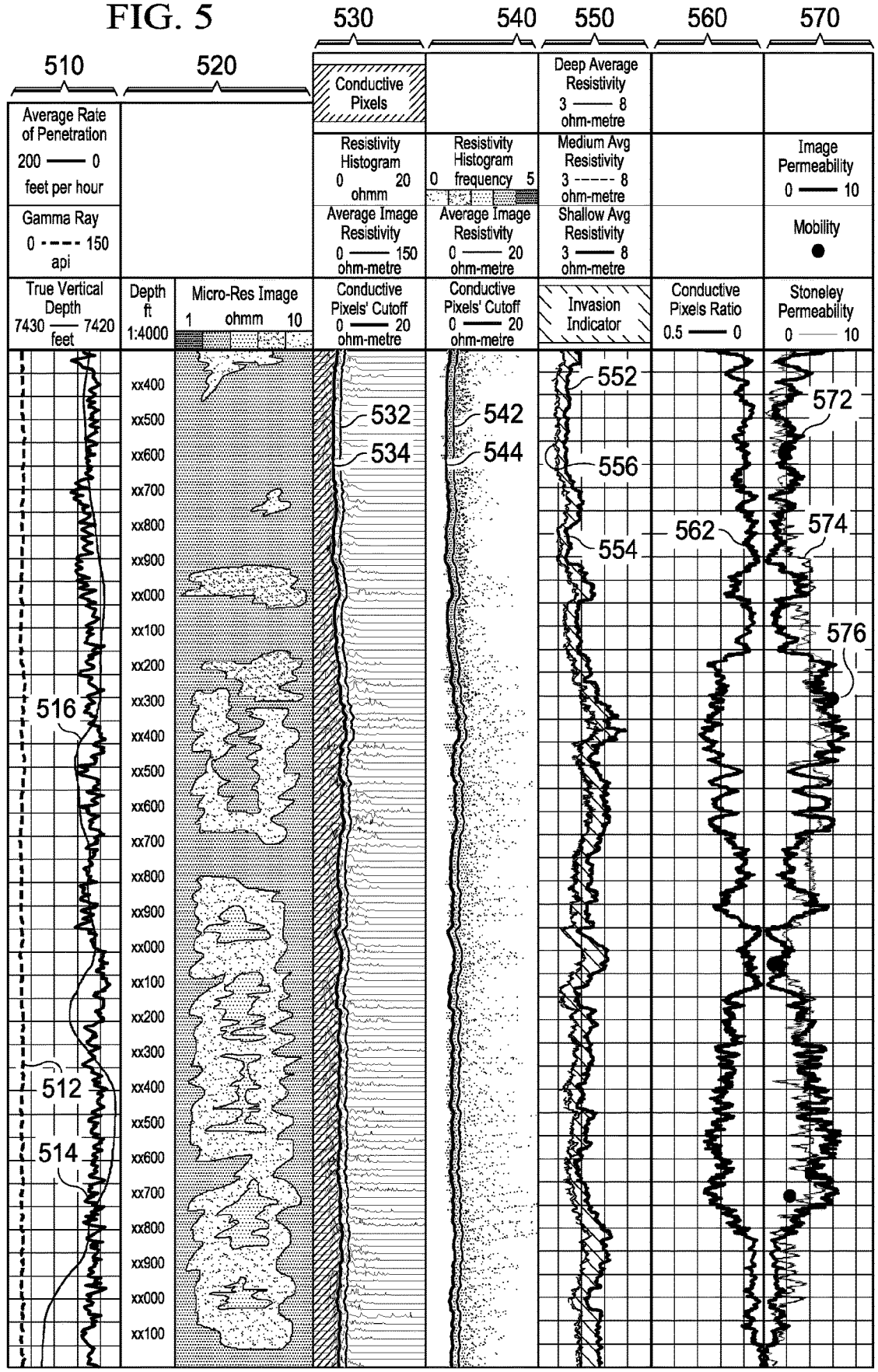
FIG. 5 illustrates an example of composite logs of a well across a horizontal section.

The display 458 is configured to provide various visual presentations of the micro-resistivity measurements. For example, the display 458 can visually present the micro-resistivity image, the histogram, the laterolog resistivity, the conductive pixel ratio, the formation tester measured fluid mobility, the porosity-independent permeability indicator and other data. FIG. 5 illustrates an example of visual presentation that may be provided by the display 458.

FIG. 5 illustrates a visual presentation of a composite log of a well across a drilled horizontal section. First Track/column 510 shows gamma ray 512, average rates of penetration 514 and true vertical depth 516. Second Track 520 shows a high resolution micro-resistivity image. Third Track 530 shows a micro-resistivity histogram, with average micro-resistivity 532 and calculated conductive pixels cut-offs 534. Shaded area 536, the interval to the left of the cutoffs 534, represents an area where conductive pixels are. Fourth Track 540 shows an alternative variable density log (VDL) presentation for the micro-resistivity histogram with the average micro-resistivity values 542 and the calculated conductive pixel cutoffs 544. Fifth Track 550 shows a shallow laterolog resistivity values 552 and deep laterolog resistivity values 554. Separation 556 is shaded to indicate nonconductive mud filtrate invasion. Sixth Track 560 shows conductive pixels ratios 562. Seventh Track 570 shows the calculated micro-resistivity image permeability values 572, acoustic Stoneley permeability values 574 and formation tester measured fluid mobility data as circles 576.

The horizontal section is divided into five zones based on the calculated permeability, as shown in Table 1. Table 1 displays average porosity, the permeability indicator values and Stoneley permeability values. As set forth above, while the permeability indicator values and Stoneley permeability values have a close, proportional relationship, there is no such a relationship between porosity and permeability values.

TABLE 1

Well-A permeability zonation.

| Zone | Interval (ft) | Porosity (pu) | Image Perm (mD) | Stoneley Perm (mD) |
|---|---|---|---|---|
| A | XX300-XX150 | 18.1 | 1.7 | 1.8 |
| B | XX150-XX950 | 17.2 | 3.5 | 3.6 |
| C | XX950-XX100 | 18.8 | 1.1 | 1.4 |
| D | XX100-XX800 | 20.6 | 3.6 | 3 |
| E | XX800-XX200 | 18.9 | 0.9 | 1.4 |

Figure 6:
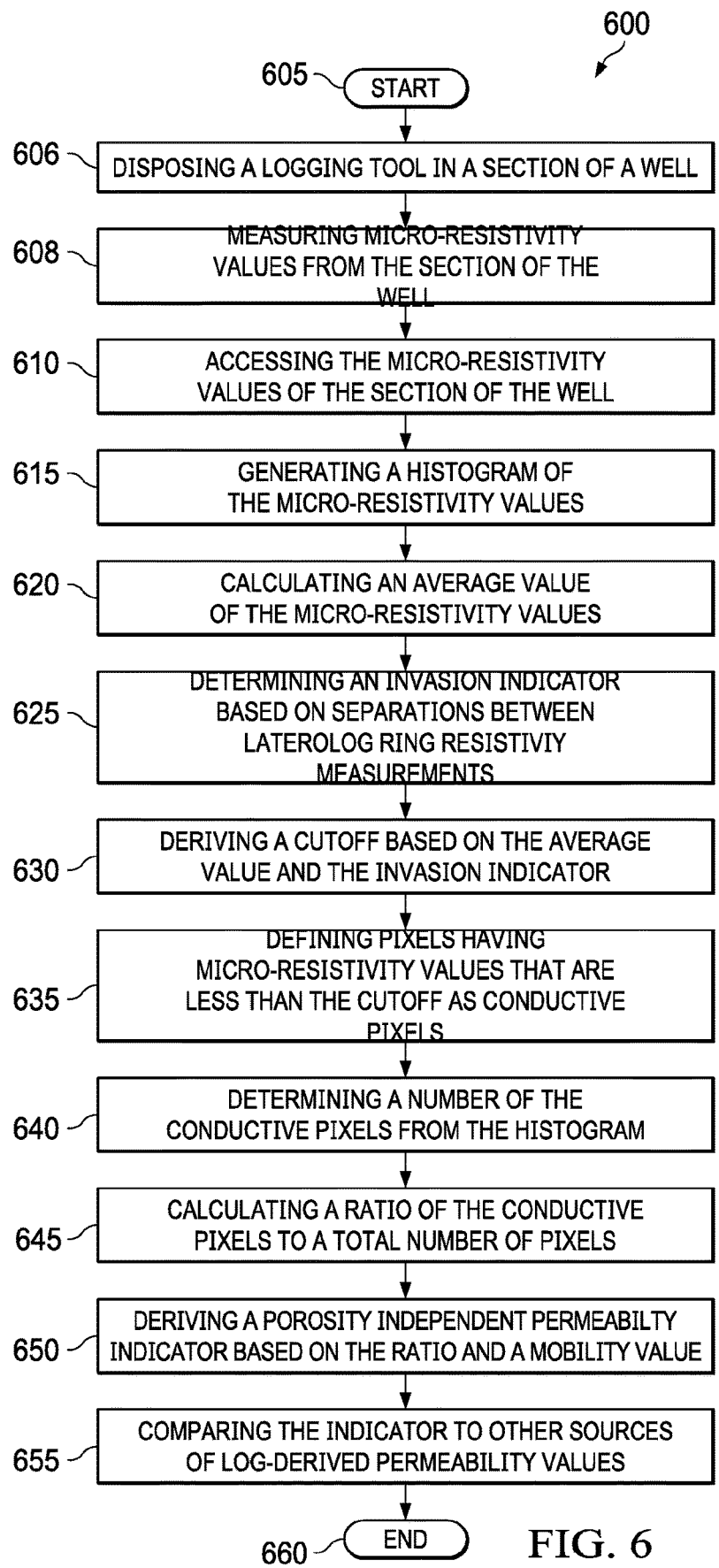
FIG. 6 illustrates a flow diagram of a method for predicting a performance of a well.

FIG. 6 illustrates a flow diagram of an example of a method 600 for prediction a performance of a well. The method 600 may be performed by a computer system such as the permeability prediction system 400 in FIG. 4. The method begins in a step 605.

In a step 606, a logging tool, e.g. a LWD tool, is lowered into the well and disposed in section of the well at a certain depth. Using the logging tool, micro-resistivity values from the section of the well at the certain depth are measured and stored in a step 608. The micro-resistivity values may be measured using a micro-resistivity imaging sensor, such as 414 in FIG. 4.

In a step 610, the micro-resistivity values of the section of the well at the certain depth are accessed. The micro-resistivity values may be in a form of a high-resolution micro-resistivity image, similar to the second track 520 in FIG. 5.

In a step 615, a histogram of the micro-resistivity values (vs. frequency) at the certain depth is generated. The histogram is generated from the micro-resistivity values in the image and may look similar to the third and fourth Tracks 530 and 540 in FIG. 5.

In a step 620, an average value of the micro-resistivity values at the certain depth is calculated. Examples of the calculated average values are shown as 532 and 542 in FIG. 5.

In a step 625, an invasion indicator is determined based on a separation between shallow and deep laterolog resistivity values, such as the separation 556 in FIG. 5. The separation indicates non-conductive mud filtrate invasion in a WBM. The laterolog resistivity values are measured by a laterolog of the LWD tool, such as 412 in FIG. 4. The invasion indicator may be calculated as I1-D/S|$^p$·C, where "D" is deep and "S" is shallow laterolog resistivity, "p" is an invasion exponent, and "C" is an invasion coefficient. In the illustrated embodiment, values of 0.1 and 0.85 are used for p and C. Values of p and C are derived using an iterative process that is initiated with p=0 and C=1. In the case of conductive invasion, S/D is used instead of D/S.

In a step 630, a cutoff value at the certain depth is derived using the average resistivity value from the step 620 and the invasion indicator from the step 625. The cutoff value is derived by multiplying the invasion indicator with the average resistivity value. Examples of the cutoff value are shown as 634 and 644 in FIG. 6.

Pixels having micro-resistivity values that are less than the cutoff value at the certain depth are defined as conductive pixels in a step 635, and their number is determined from the histogram in a step 640. The conductive pixels would be located on the left side of the cutoff value on the histogram, as indicated by the shaded area 536 in FIG. 5.

Using the number of the conductive pixels, a ratio of the conductive pixels to a total number of pixels is calculated in a step 645. The number of the conductive pixels may be divided by the total number of pixels. Examples of the ratio are shown as 562 in FIG. 5.

In a step 650, a porosity-independent permeability indicator at the certain depth is derived using the ratio of the step 645 and formation tester data. In the step 650, the ratio of conductive pixels is normalized to a corresponding fluid mobility value from the formation tester data. Examples of the derived porosity-independent permeability indicator and the fluid mobility value are shown as 672 and 676 in FIG. 6.

To benchmark future data gathering requirements, the porosity-independent permeability indicator is compared to log-derived permeability values from other sources in a step 655. Stoneley permeability values and core/NMR permeability values from the same or offset well, and the formation tester values can be used in comparison. Examples of the Stoneley permeability value are shown as 574 in FIG. 5. Once the further data gathering requirements, e.g., a desired number of correlations with outside source values, are met and the standard normalization factors are obtained, the step 655 may be omitted.

Although not illustrated, the method 600 may include additional steps of managing the well using the using the porosity-independent permeability indicator. For example, the method 600 may include steps of optimizing and implementing a completion design, such as partitioning the best-flowing intervals in the formations using a petrophysical attribute such as a rock mechanical moduli, a brittleness and/or a porosity and the lateral permeability variation from the porosity-independent permeability indicator, and performing a completion operation on such intervals. The method 600 may also include steps of managing the well's reservoir, such as predicting producible fluids and hydrocarbons by analyzing the "plumbing" of the well's reservoir using the porosity-independent permeability indicator, and performing enhanced oil recovery operation by determining drawdown/production rates for the maximum sweep efficiency, e.g., not to have too high drawdowns to encroach unwanted water, and pressure maintenance, e.g., locating injection wells for enhanced oil recovery. The method 600 ends in a step 660.

It is understood that although the steps in the method 600 are described with a reference to a section of a well at a certain depth, the steps are not limited to the certain depth and may be repeated for other depths. It is also understood that the method 600 does not use porosity value in any of the steps and hence is porosity-independent.

While the methods disclosed herein have been described and shown with reference to particular steps performed in a particular order, it will be understood that these steps may be combined, subdivided, or reordered to form an equivalent method without departing from the teachings of the present disclosure. Accordingly, unless specifically indicated herein, the order or the grouping of the steps is not a limitation of the present disclosure.

Those skilled in the art to which this application relates will appreciate that other and further additions, deletions, substitutions and modifications may be made to the described embodiments.

Some of the techniques and operations described herein may be implemented by a one or more computing systems configured to provide the functionality described. In various instances, a computing system may include any of various types of devices, including, but not limited to, personal computer systems, desktop computers, laptops, notebooks, mainframe computer systems, handheld computers, workstations, tablets, application servers, computer clusters, storage devices, or any type of computing or electronic device.

The above-described system, apparatus, and methods or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system or apparatus described herein.

Certain embodiments disclosed herein can further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Embodiments disclosed herein include:

A. A method for predicting a performance of a well, comprising determining a number of conductive pixels from a histogram of micro-resistivity values measured by a logging tool from a section of a well at a certain depth, calculating a ratio of the conductive pixels to a total number of pixels in the histogram, and deriving a porosity-independent permeability indicator for the section at the certain depth based on the ratio and a fluid mobility value from formation tester data.

B. A system for predicting a performance of a well, comprising a logging tool configured to measure micro-resistivity values from a section of a well at a certain depth, and a processor configured to determine a number of conductive pixels from a histogram of the micro-resistivity values, calculate a ratio of the conductive pixels to a total number of pixels in the histogram, and derive a porosity-independent permeability indicator for the section at the certain depth based on the ratio and a fluid mobility value from formation tester data.

C. A non-transient computer readable medium containing program instructions that, when executed by a computer, cause the computer to perform a method for predicting a performance of a well, the method comprising determining a number of conductive pixels from a histogram of micro-resistivity values measured by a logging tool from a section of a well at a certain depth, calculating a ratio of the conductive pixels to a total number of pixels in the histogram, and deriving a porosity-independent permeability indicator for the section at the certain depth based on the ratio and a fluid mobility value from formation tester data.

Each of embodiments A, B, and C may have one or more of the following additional elements in combination:

Element 1: wherein the determining a number of conductive pixels includes generating the histogram from a micro-resistivity image of the micro-resistivity values, calculating an average value of the micro-resistivity values of the section at the certain depth, determining an invasion indicator based on a separation between a shallow laterolog ring resistivity measurement of the section at the certain depth and a deep laterolog ring resistivity measurement of the section at the certain depth, deriving a cutoff based on the average value and the invasion indicator, and defining pixels having micro-resistivity values that are less than the cutoff as the conductive pixels. Element 2: disposing the logging tool in the section of the well at the certain depth and measuring the micro-resistivity values from the section of the well at the certain depth. Element 3: partitioning the section based on a petrophysical attribute and the permeability indicator. Element 4: wherein the method is repeated to derive a permeability indicator for the section of the well at a different depth. Element 5: comparing the permeability indicator to an acoustic Stoneley permeability value for the section at the certain depth. Element 6: comparing the permeability indicator to core and/or nuclear magnetic resonance (NMR) permeability value of the section at the certain depth. Element 7: wherein the processor is further configured to generate the histogram from a micro-resistivity image of the micro-resistivity values, calculate an average value of the micro-resistivity values, determine an invasion indicator using a separation between a shallow laterolog ring resistivity measurement of the section at the certain depth and a deep laterolog ring resistivity measurement of the section at the certain depth, derive a cutoff value based on the average value and the invasion indicator, and define pixels having micro-resistivity values less than the cutoff vale as the conductive pixels. Element 8: wherein the ratio is normalized to the fluid mobility value. Element 9: a formation tester configured to acquire the formation tester data from a wipe run. Element 10: wherein the micro-resistivity values are measured using an array of button electrodes in the logging tool. Element 11: wherein the logging tool includes a laterolog sensor configured to acquire the shallow laterolog measurement and the deep laterolog measurement. Element 12: wherein the invasion indicator indicates non-conductive mud filtrate invasion. Element 13: wherein the deriving a porosity-independent permeability indicator includes normalizing the ratio to the fluid mobility value.

What is claimed is:

1. A method for predicting a well performance, comprising:
   determining a number of conductive pixels from a histogram of micro-resistivity values measured by a logging tool from a section of a well at a certain depth, wherein the determining includes:
   calculating an average value of the micro-resistivity values of the section at the certain depth;
   determining an invasion indicator based on a separation between a shallow laterolog ring resistivity measurement of the section at the certain depth and a deep laterolog ring resistivity measurement of the section at the certain depth;
   deriving a cutoff value based on the average value and the invasion indicator; and
   defining pixels having micro-resistivity values that are less than the cutoff value as the conductive pixels;
   calculating a ratio of the number of the conductive pixels to a total number of pixels in the histogram of the micro-resistivity values; and
   deriving a porosity-independent permeability indicator for the section at the certain depth based on the ratio and a fluid mobility value from formation tester data.

2. The method of claim 1, wherein the determining further includes:
   generating the histogram from a micro-resistivity image of the micro-resistivity values.

3. The method of claim 1, further comprising disposing the logging tool in the section of the well at the certain depth and measuring the micro-resistivity values from the section of the well at the certain depth.

4. The method of claim 1, further comprising partitioning the section based on a petrophysical attribute and the porosity-independent permeability indicator.

5. The method of claim 1, wherein the method is repeated to derive a permeability indicator for the section of the well at a different depth.

6. The method of claim 1, further comprising comparing the porosity-independent permeability indicator to an acoustic Stoneley permeability value for the section at the certain depth.

7. The method of claim 1, further comprising comparing the porosity-independent permeability indicator to core and/or nuclear magnetic resonance (NMR) permeability value of the section at the certain depth.

8. A system for predicting a well performance, comprising:
   a logging tool configured to measure micro-resistivity values from a section of a well at a certain depth; and
   a processor configured to:
   determine a number of conductive pixels from a histogram of the micro-resistivity values by:
   calculating an average value of the micro-resistivity values;
   determining an invasion indicator using a separation between a shallow laterolog ring resistivity measurement of the section at the certain depth and a deep laterolog ring resistivity measurement of the section at the certain depth;
   deriving a cutoff value based on the average value and the invasion indicator; and
   defining pixels having micro-resistivity values less than the cutoff vale as the conductive pixels;
   calculate a ratio of the number of the conductive pixels to a total number of pixels in the histogram of the micro-resistivity values; and
   derive a porosity-independent permeability indicator for the section at the certain depth based on the ratio and a fluid mobility value from formation tester data.

9. The system of claim 8, wherein the processor is further configured to:
   generate the histogram from a micro-resistivity image of the micro-resistivity values.

10. The system of claim 8, wherein the ratio is normalized to the fluid mobility value.

11. The system of claim 8, further comprising a formation tester configured to acquire the formation tester data from a wipe run.

12. The system of claim 8, wherein the micro-resistivity values are measured using an array of button electrodes in the logging tool.

13. The system of claim 8, wherein the logging tool includes a laterolog sensor configured to acquire the shallow laterolog measurement and the deep laterolog measurement.

14. The system of claim 8, wherein the invasion indicator indicates a non-conductive mud filtrate invasion.

15. A non-transient computer readable medium containing program instructions that, when executed by a computer, cause the computer to perform a method for predicting a well performance, the method comprising:
  determining a number of conductive pixels from a histogram of micro-resistivity values measured by a logging tool from a section of a well at a certain depth, wherein the determining includes:
    calculating an average value of the micro-resistivity values of the section at the certain depth;
    determining an invasion indicator based on a separation between a shallow laterolog ring resistivity measurement of the section at the certain depth and a deep laterolog ring resistivity measurement of the section at the certain depth;
    deriving a cutoff value based on the average value and the invasion indicator; and
    defining pixels having micro-resistivity values that are less than the cutoff value as the conductive pixels;
  calculating a ratio of the number of the conductive pixels to a total number of pixels in the histogram of the micro-resistivity values;
  calculating a ratio of the number of the conductive pixels to a total number of pixels in the histogram of the micro-resistivity values; and
  deriving a porosity-independent permeability indicator for the section at the certain depth based on the ratio and a fluid mobility value from formation tester data.

16. The computer readable medium of claim 15, wherein the determining further includes:
  generating the histogram from a micro-resistivity image of the micro-resistivity values.

17. The computer readable medium of claim 15, wherein the deriving includes normalizing the ratio to the fluid mobility value.

18. The computer readable medium of claim 15, wherein the method further comprises acquiring the formation tester data from a wipe run.

19. The computer readable medium of claim 15, wherein the method further comprises partitioning the section based on a petrophysical attribute and the permeability indicator.

20. The computer readable medium of claim 15, wherein the micro-resistivity values are measured using an array of button electrodes in the logging tool.

* * * * *